(12) United States Patent
Schultz et al.

(10) Patent No.: US 6,377,748 B1
(45) Date of Patent: Apr. 23, 2002

(54) REPLAY BIT STREAM SEARCHING

(75) Inventors: Mark Alan Schultz, Carmel; Donald Henry Willis, Indianapolis; Jianlei Xie, Carmel; John Alan Hague, Indianapolis; Steven Anthony Barron, Fishers; Barth Alan Canfield, Indianapolis, all of IN (US)

(73) Assignee: Thomson Licensing S.A., Boulogne Cedex (FR)

( * ) Notice: Subject to any disclaimer, the term of this patent is extended or adjusted under 35 U.S.C. 154(b) by 0 days.

(21) Appl. No.: 09/024,399

(22) Filed: Feb. 17, 1998

Related U.S. Application Data

(60) Provisional application No. 60/039,573, filed on Feb. 18, 1997.

(51) Int. Cl.[7] .................................................. H04N 7/52
(52) U.S. Cl. .......................... 386/124; 386/46; 386/125
(58) Field of Search ................................ 386/125–126, 386/109, 110, 113, 68, 112; H04N 7/52

(56) References Cited

U.S. PATENT DOCUMENTS 5,535,008 A    7/1996  Yamagishi et al.
6,128,015 A  * 10/2000  Zenda ........................ 348/403
6,141,491 A  * 10/2000  Yamagishi et al. ......... 386/109
6,154,603 A  * 11/2000  Willis et al. ................ 386/125

FOREIGN PATENT DOCUMENTS

| EP | 677961 A2 | 10/1995 | .......... H04N/5/926 |
| EP | 695098 A2 | 1/1996 | .......... H04N/9/804 |
| EP | 696798 A1 | 2/1996 | .......... G11B/20/12 |
| EP | 729153 A2 | 8/1996 | .......... G11B/27/32 |
| EP | 737975 A2 | 10/1996 | .......... G11B/20/12 |

* cited by examiner

*Primary Examiner*—Vincent F. Boccio
(74) *Attorney, Agent, or Firm*—Joseph S. Tripoli; Harvey D. Fried; Francis A. Davenport

(57) ABSTRACT

An apparatus for reproducing a digitally encoded signal from a medium, comprises a transducer for transducing the digitally encoded signal and generating a bit stream therefrom. A processor is coupled to receive the bit stream for controllably processing the bit stream. A memory is coupled to the processor for storing the processed bit stream information. A controller is coupled to control the memory and the processor for controlling identification of information within the bit stream, wherein the controller controls the processor to identify a specific sector type in the bit stream and responsive to the specific sector identification the controller controls the memory for storing the identified specific sector.

14 Claims, 6 Drawing Sheets

EQU 1  PIC A = 8 SECTORS
EQU 2  PIC A = 1048 + 6 * 2048 + 499 BYTES
       PIC A = 13,835 BYTES

REPLAY BIT STREAM SEARCHING

This is a non-provisional application of provisional application serial No. 60/039,573 filed Feb. 18, 1997 by Mark A. Schultz et al.

FIELD OF THE INVENTION

This invention relates to the reproduction of a digitally encoded signal from a medium and in particular to the identification of replay data in a multiplex format.

BACKGROUND OF THE INVENTION

The introduction of disks recorded with digitally compressed audio and video signals, for example, utilizing MPEG compression protocols, offers the consumer sound and picture quality virtually indistinguishable from the original material. However, consumer users will expect such digital video disks or DVDs to offer features similar to those of their analog video cassette recorder or VCR. For example, a VCR may reproduce in either forward or reverse directions at speeds other than the recorded speed. Such non-standard speed playback features are also known as trick play modes. The provision of trick play features are less easily provided with MPEG encoded video signals due to the hierarchical nature of the compression which forms pictures into groups having varying degrees of compression. These groups are termed groups of pictures or GOPs, and require decoding in sequence. A detailed description of the MPEG 2 standard is published as ISO/IEC Standard 13818-2. However, in simple terms, an MPEG 2 signal stream may comprise three types of pictures having varying degrees of content compression. An intra-coded frame or I frame has the least compression of the three types and may be decoded without reference to any other frame. A predicted frame or P frame is compressed with reference to a preceding I or P frame and achieves greater degree of compression than an intra-coded frame. The third type of MPEG frame, termed a bi-directionally coded or B frame, may be compressed based on predictions from preceding and/or succeeding frames. Bi-directionally coded frames have the greatest degree of compression. The three types of MPEG frames are arranged in groups of pictures or GOPs. The GOP may for example contain 12 frames arranged as illustrated in FIG. 1A. Since only an intra-coded frame is decodable without reference to any other frame, each GOP may only be decoded following the decoding of the I frame. The first predicted frame or P frame, may be decoded and stored based on modification of the stored, preceding I frame. Subsequent P frames may be predicted from the stored preceding P frame. The prediction of P frames is indicated in FIG. 1A by the curved, solid arrow head lines. Finally, bi-directionally coded or B frames may be decoded by means of predictions from preceding and or succeeding frames, for example, stored I and P frames. Decoding of B frames by predictions from adjacent stored frames is depicted in FIG. 1A by the curved, dotted arrow head lines.

The hierarchical nature of the coded frames comprising MPEG groups of pictures necessitates that the I and P frames of each GOP are decoded in the forward direction. Thus, reverse mode features may be provided by effectively jumping back to an earlier, or preceding I frame and then decoding in a forward direction through that GOP. The decoded frames being stored in frame buffer memories for subsequent read out in reverse to achieve the desired reverse program sequence. FIG. 1B illustrates play back in the forward direction at normal speed and at a time prior to time to, a reverse three times speed mode trick play mode is selected. The trick play mode is initiated at time to where I-frame I(25) is decoded and displayed. The next frame required for decoding is I frame I(13), thus the transducer is repositioned, as indicated by arrow J1 to acquire frame I(13). Having recovered and decoded I-frame I(13), the transducer tracks, as indicated by arrow J2 to acquire and decode frame P(16). The process is repeated as indicated by arrows J3, J4. Following the acquisition and decoding of frame P (22) the transducer is moved as depicted by arrow Jn to recover frame I (1). To smoothly portray scene motion requires the decoding and display of I, P, and possibly B-frames. The jump and play process is repeated for preceding GOP, thereby progressing haltingly backwards through the records whilst smoothly portraying the program material in a reverse sequence at the video output.

The provision of visually smooth reproduction during trick mode reproduction requires timely disk retrieval and access to specific pictures from memory. Although each digital disk is encoded with navigation data which provides picture access points within each video object unit, these are limited in number, and may inherently contribute to temporally aliased image motion. To achieve temporally smooth trick mode reproduction, at multiple speeds in forward and reverse directions requires access to, and decoding of all encoded pictures. Although such performance is attainable at the cost of storage capacity, bit stream analysis and selection for buffer storage provides opportunities for improved trick mode reproduction through efficient memory utilization.

SUMMARY OF THE INVENTION

In an inventive arrangement, an apparatus reproduces a digitally encoded signal from a medium. The apparatus comprises a transducer for transducing the digitally encoded signal and generating a bit stream therefrom. A processor is coupled to receive the bit stream for controllably processing the bit stream. A memory is coupled to the processor for storing the processed bit stream information. A controller is coupled to control the memory and the processor for controlling identification of information within the bit stream, wherein the controller controls the processor to identify a specific sector type in the bit stream and responsive to the specific sector identification the controller controls the memory for storing the identified specific sector.

In an inventive method a start code is acquired from a plurality of start codes in a data stream arranged in a plurality of sectors transduced during reproduction by a digital disk apparatus. The method comprises the steps of searching the data stream to locate a specific sector type in the plurality of sectors. The specific sector type is searched to locate a start code from the plurality of start codes. The start code is tested to determine if it is incomplete. Searching the data stream to locate a second sector of the specific sector type in the plurality of sectors. Searching the second sector of the specific sector type to locate a second start code of the start code type from the plurality of start codes. Determining if the second start code is the residue of the incomplete start code. Combining the incomplete start code value and the residue start code value to form a complete start code.

A further inventive apparatus for reproducing a digitally encoded signal from a medium, comprises a transducer for transducing the digitally encoded signal and generating a bit stream therefrom. A first memory is coupled to the transducer for storing the bit stream. A second memory for storing data is controllably coupled from the first memory. A controller is coupled to control the first and second memories for controlling identification of information within the bit stream wherein the controller controls the first memory to output the bit stream from a specific sector address therein, and the controller controls the second memory to store a first part of the bit stream output from the specific sector address.

In another inventive apparatus a digitally encoded signal is reproduced from a medium. The apparatus comprises a transducer for transducing the digitally encoded signal and generating a bit stream therefrom. A memory is coupled to the transducer for storing the bit stream. A processor is coupled to the memory for processing the stored bit stream to identify an MPEG start code contained therein. The processor searches the stored bit stream to identify the MPEG start code in the stored bit stream and responsive to the MPEG start code identification the processor indicates the identification and stores a sector address of the identified MPEG start code.

DETAILED DESCRIPTION

Figure 2:
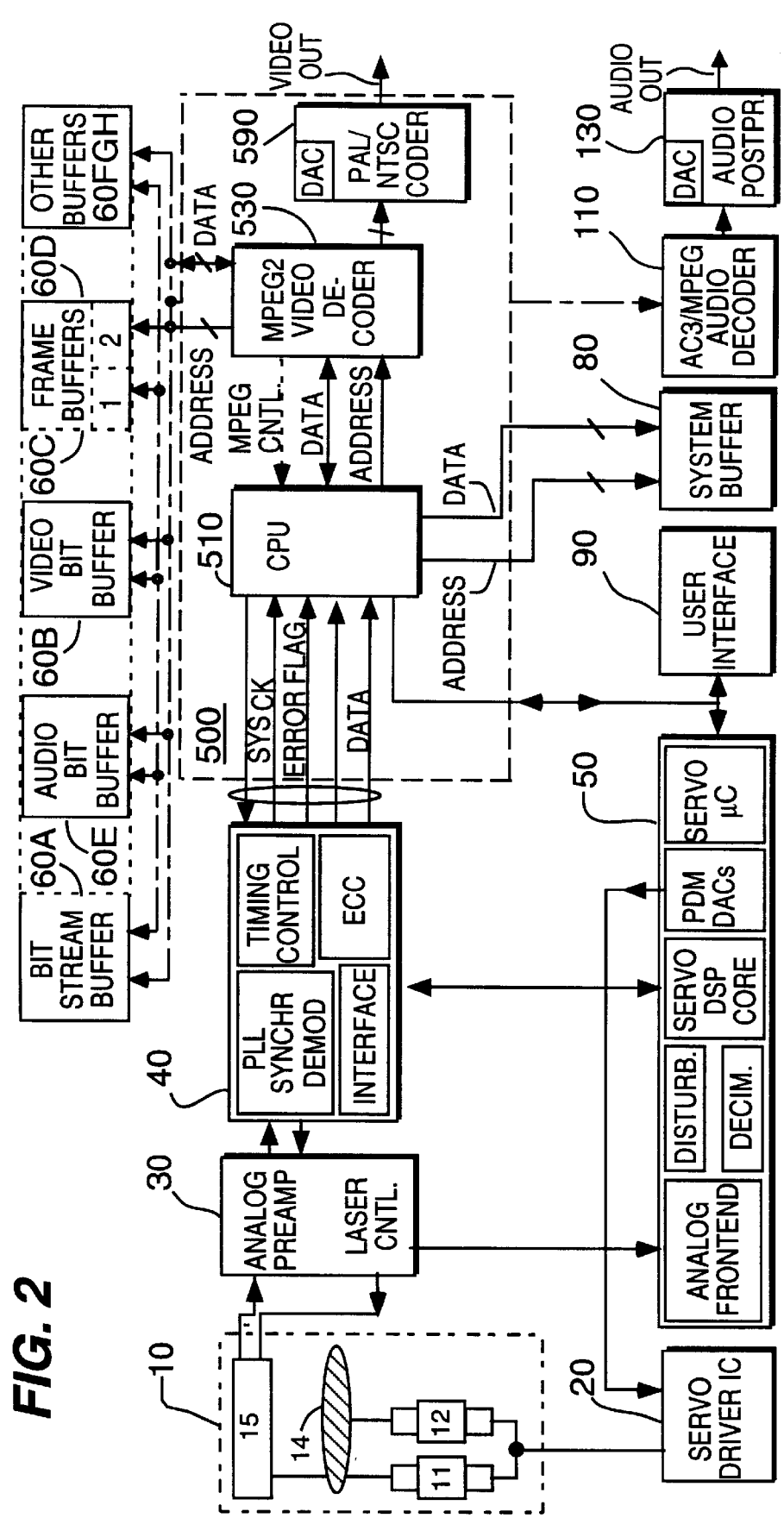
FIG. 2 is a block diagram of an exemplary digital disk player including inventive arrangements.

FIG. 2 depicts an exemplary block diagram of a digital video disk player. In block 10 a deck is shown which may accept a digitally recorded disk 14 for rotation by a motor 12. A digital signal is recorded on disk 14 as a spiral track containing pits with respective pit lengths determined by an 8/16 modulation coding responsive to respective signal data bits. The record on disk 14 is read by pick up 15 which gathers reflected illumination from a laser. The reflected laser light is collected by a photo detector or opto pick-up device. An imaging device, for example a lens or mirror, which form part of transducer pick-up 15, is servo controlled and driven by motor 11 to follow the recorded track. Different parts of the recording may be accessed by rapidly repositioning the imaging device. Servo controlled motors 11 and 12 are driven by integrated circuit drive amplifier 20. Pick up 15 is coupled to an opto preamplifier, block 30, which includes drive circuitry for the laser illuminator and a preamplifier which provides amplification and equalization for the reflected signal output from the opto pick-up device. The amplified and equalized replay signal from opto preamplifier 30 is connected to a channel processor block 40 where the replay signal is employed to synchronize a phase locked loop which is utilized to demodulate the 8:16 modulation employed for recording.

The MPEG encoded bitstream is encoded for error detection and correction by means of Reed Solomon product coding which is applied in blocks of 16 sectors, where each sector contains 2048 bytes of payload data. Thus following 8:16 demodulation the replay data stream is de-interleaved or unshuffled and error corrected by means of Reed Solomon product correction implemented in ECC buffer memories 45 and 46 of FIG. 4. Each buffer stores 16 sectors of the replay data stream arranged as an array to facilitate de-interleaving and to enable the required row and column product processing. The cascaded ECC buffer memories introduce a delay to reproduced serial bit stream of approximately (2 * 16 * 1.4) milliseconds, where 2 represents the pair of ECC buffers, 16 represents the sectors over which the correction is applied and 1.4 milliseconds represents a sector period at 1X rotational speed. Thus the reproduced serial bit stream is delayed by a minimum of approximately 45 milliseconds.

The error corrected signal bitstream 41 is coupled via a link processor to a bit stream or mechanical/track buffer memory 60A. The track buffer comprises a DRAM memory type and is used to store an amount of replayed data such that data losses during transducer or pickup 15 repositioning will not result in any visible deficiency when decoded. Thus the final output image stream will appear to be continuous or seamless to the viewer. Bitstream buffer memory 60A is part of an exemplary 16 megabit DRAM memory. A further exemplary 16 megabit SDRAM memory block is partitioned to provide frame buffers 60C and 60D which provide storage for at least two decoded image frames, compressed video bit stream storage in buffer 60B prior to decoding, an audio bit stream buffer 60E and other storage in buffers 60F, G and H. The channel processor 40 also includes timing control circuitry which control writing by link 505 to bitstream buffer 60A. Data may be intermittently written to the bitstream buffer as a consequence of changes in replay track addresses, for example, resulting from user defined replay video content such as a "Directors cut", parental guidance selection, or even user selectable alternative shot angles. To facilitate more rapid access and recovery of the recorded signal, disk 14 may be rotated at an increased speed resulting in the transduced bitstream having a higher bit rate, and possibly intermittent delivery.

As has been described, the recorded data stream is arranged in ECC blocks of 16 sectors. Each sector has a unique sector identification address which is protected with error correction bits that are processed by ECC block 47 of FIG. 4. However, because the sector address is short and sector specific, any delay to sector address signal 42 resulting from error correction processing block 47 is insignificant. Sector address signal 42 is coupled to provide positional information to servo control integrated circuit 50. Integrated circuit 50 provides drive and control signals for servo motors 11 and 12. Motor 12 rotates disk 14 and provides servo controlled rotation at a plurality of speeds. The opto pickup or transducer 15 is positioned and servo controlled by motor 11 responsive to sector address signal 42, and in addition, may be controlled to rapidly reposition or jump to another sector address, or location on the disk surface in response to a sector address request, transmitted by $I^2C$ control bus 514, and coupled via element 54 of FIG. 4.

The digital video disk player is controlled by a central processing unit or CPU, element 510 of block 500, which accepts the reproduced bitstream and error flags from channel IC 40, and provides control instructions to servo IC 50. In addition CPU 510 accepts user control commands from user interface 90, and MPEG decoder control functions from the MPEG decoder element 530 of block 500. A system buffer memory 80 is addressed by and provides data to CPU 510. For example, buffer 80 may comprise both RAM and PROM memory locations. The RAM may be used to store various data extracted from bitstream 41 by CPU 510, for example such data may include descrambling or decryption information, bitstream and frame buffer memory management data, and navigation data. The PROM may, for example contain advantageous transducer jump algorithms which facilitate trick mode operation at a selection of speeds in forward or reverse directions.

Figure 3:
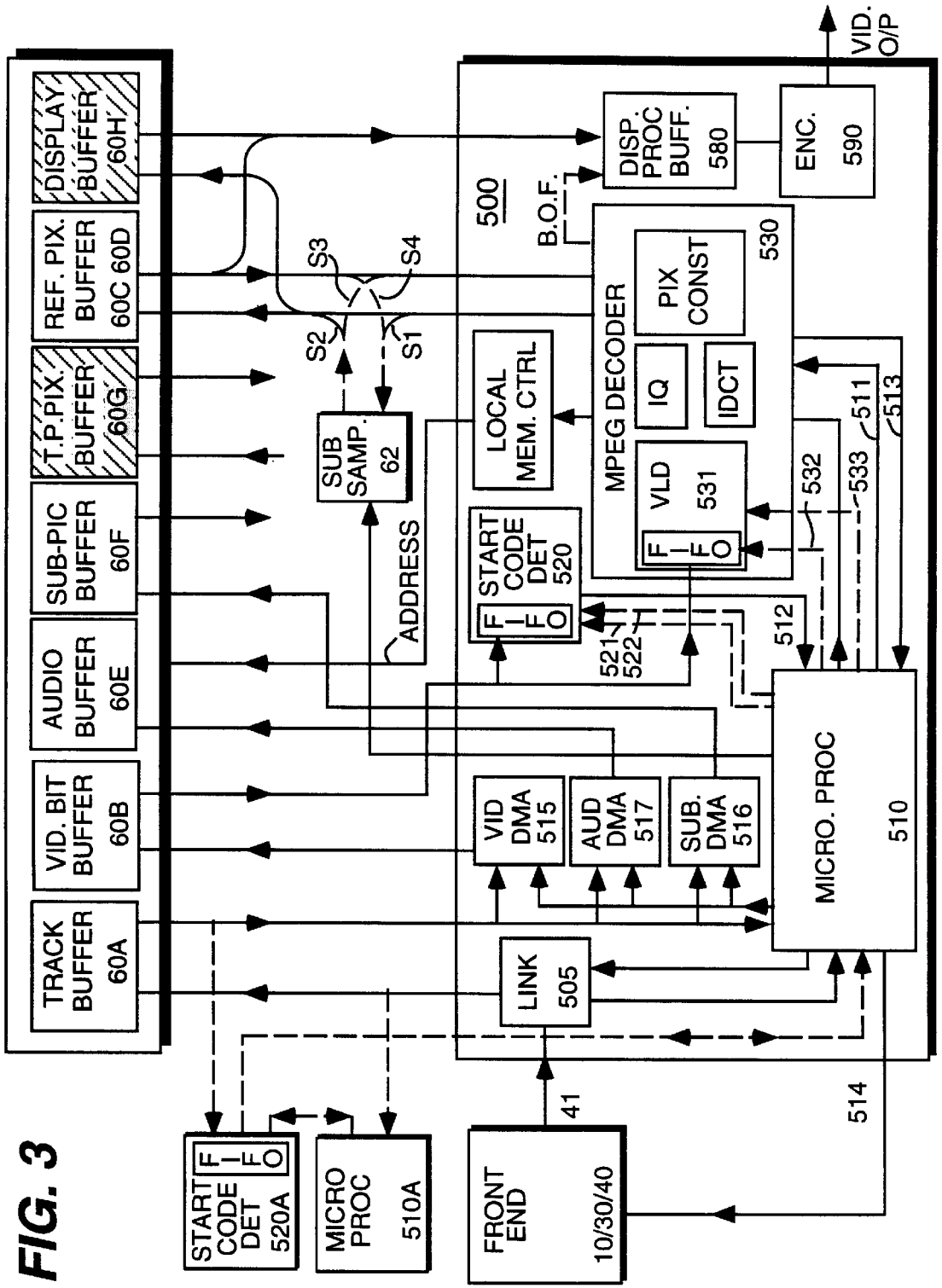
FIG. 3 shows in greater detail part of FIG. 2 and depicting various inventive arrangements.

The MPEG encoded bitstream is coupled to link processor 505 in FIG. 3, which may function as a hardware demultiplexor to separate MPEG encoded audio, video and control information from the DVD formatted bitstream. Alternatively, bitstream demultiplexing may be accomplished by software control of direct memory access or DMA of buffer 60A, from CPU 510 of FIG. 3. The encoded bitstream prior to or within track buffer 60A is searched by microcontroller 510 to locate and read headers and to extract navigation data.

Figure 5A:
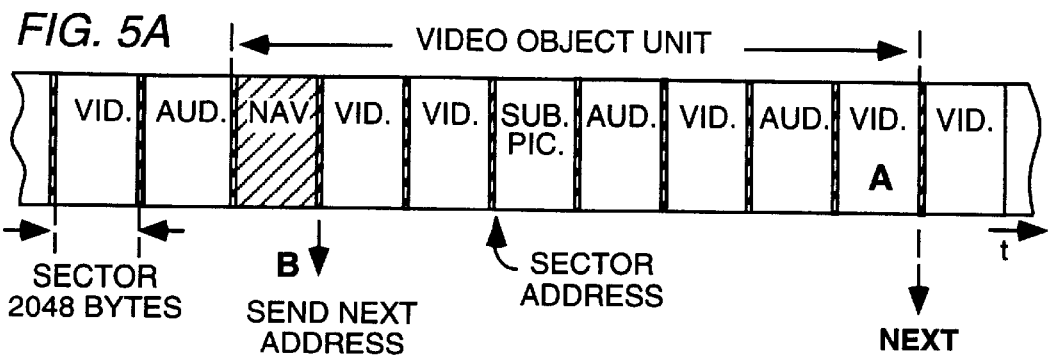
FIGS. 5A and 5B depict an exemplary bit stream before track buffering.

Microcontroller 510 is coupled the front end via I²C control bus signal 514 to control or request transducer repositioning to acquire the next sector required by a trick play sequence. The transducer positioning may be controlled by an advantageous stored sequence, or jump play pattern which is indexed with reference to replayed sector addresses and GOP sector addresses read from navigation pack data contained in each video object unit or VOBU. Exemplary sector addresses and VOBU navigation pack are depicted in FIG. 5A. However, following transducer repositioning, the sectors initially retrieved from the front end may be identified by exemplary microcontroller 510 as not those requested by the jump instruction. Thus, microcontroller 510 advantageously overwrites this unwanted data in track buffer 60A and ensures that only the requested data is present in the buffer.

Having identified sector addresses or headers, microcontroller 510 controls direct memory access of buffer 60A which effectively separates MPEG data from other DVD formatted data stored in the buffer. Thus, video DMA 515 separates compressed video bits which are coupled for storage in exemplary video bit buffer 60B. Similarly compressed audio bits are read from buffer 60A and stored in audio buffer 60E. Sub-picture data is also retrieved from track buffer 60A by DMA and stored in buffer 60F.

The compressed video bit stream in video bit buffer 60B is searched to locate picture or higher level start codes by start code detector 520. A detected start code signal 512 is coupled to microcontroller 510 which then communicates with MPEG decoder 530, via signal 511, to indicate the next picture type, the quantizer setting and to initiate decoding. A decoder status signal 513 is coupled back to microcontroller 510 to indicate the completion of decoding and that picture data available for display or storage. Compressed video bit buffer 60B may be considered to function as a FIFO or circular buffer where the stored bitstream is sequentially accessed for MPEG decoding, however, trick mode operation may be advantageously facilitated by random access of buffer 60B, as will be described.

Within MPEG decoder 530 the video bit stream is processed by a variable length decoder 531 which searches the bitstream to locate slice and macro-block start codes. Certain decoded pictures from each group of pictures are written to frame buffers 60C and 60D for subsequent use as predictors when deriving or constructing other pictures, for example P and B pictures, of the GOP. Frame buffers 60C and 60D have a storage capacity of at least two video frames. Separated audio packets are stored in audio bit buffer 60E which is read out and coupled for audio decoding in block 110. Following MPEG or AC3 audio decoding a digitized audio signal results which is coupled to a n audio post processor 130 for digital to analog conversion and generation of various base band audio signal outputs. A digital video output signal is transformed into raster scan format by display buffer 580 from decoded blocks read from reference frame buffer 60C/D. However, during trick mode operation the output signal source may be a field memory advantageously reconfigured from memory unused during tick mode operation. Thus block to raster scan conversion within display buffer 580 may be advantageously controlled responsive to trick mode operation. The display buffer is coupled to encoder 590 which provides digital to analog signal conversion and generates baseband video components and encoded video signals.

Figure 1A:
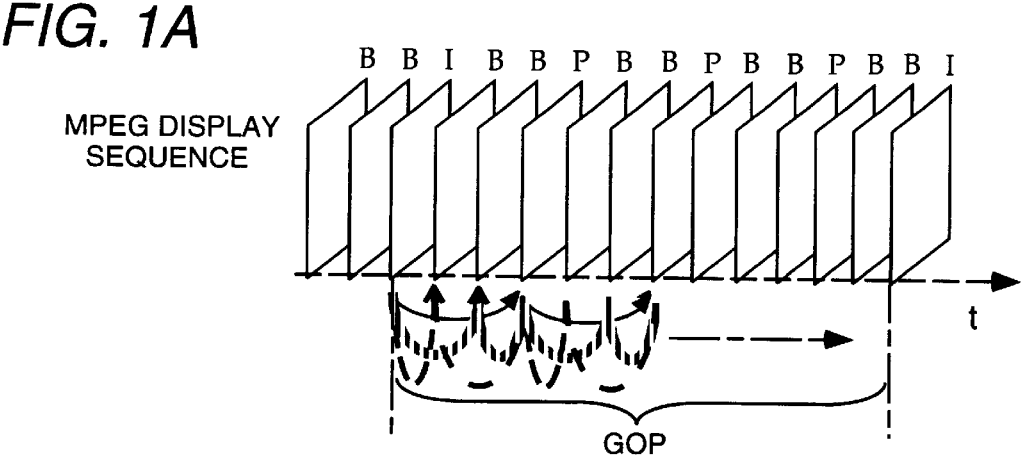
FIG. 1A illustrates an MPEG 2 group of pictures.
Figure 1B:
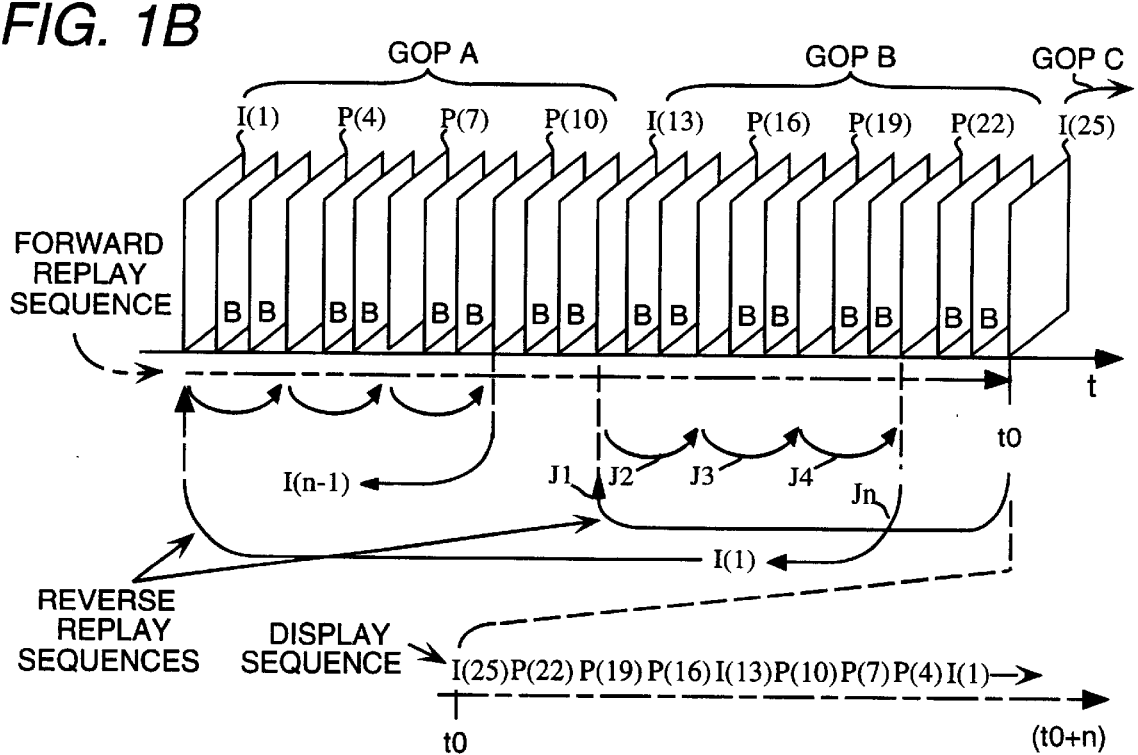
FIG. 1B illustrates recorded groups of pictures, during replay and reverse trick play at three times speed.

Operation of the exemplary video player illustrated in FIG. 2 may be considered with reference to FIG. 1B which illustrates a forward play and reverse trick play sequence. As described previously, the coded relationship existing within each GOP necessitates that each group of pictures is decoded in a forward direction starting from an I-frame or picture. Thus, reverse mode features may be provided by effectively jumping back to transduce an earlier, or preceding I picture and then decoding in a forward direction through that GOP. The decoded pictures are stored in frame buffer memories for subsequent read out in reverse order. However, sequences that include B pictures may utilize further advantageous features which will be described. In FIG. 1B it will be assumed that at some time prior to time t0, for example at I-picture I(1), the exemplary video player assumed a forward play condition in response to a user command. Each group of pictures is decoded in the forward direction as illustrated in FIG. 1A by the arrow headed lines linking I, B and P frames. At a time prior to time t0, a three times play speed reverse trick mode is selected, and initiated at time t0 where I-picture I(25) is decoded and displayed. As previously described the next picture required for reverse trick play decoding is I-picture I(13), thus the transducer is moved, as indicated by arrow J1 to acquire picture I(13). The signal recovery and decoding then follows a play sequence indicated in FIG. 1B by arrows J1, to acquire I(13), J2, to acquire P(16), J3, to P(19), J4 to P(22) . . . Jn. The intervening B pictures shown in FIG. 1B are transduced but may be discarded, for example, in the buffer by over writing or by decoder inhibit, as required specific to each trick play mode. To avoid the previously described requirement for additional reverse mode video buffering, various advantageous methods for MPEG decoder, buffer memory control and allocation are employed.

Figure 5B:
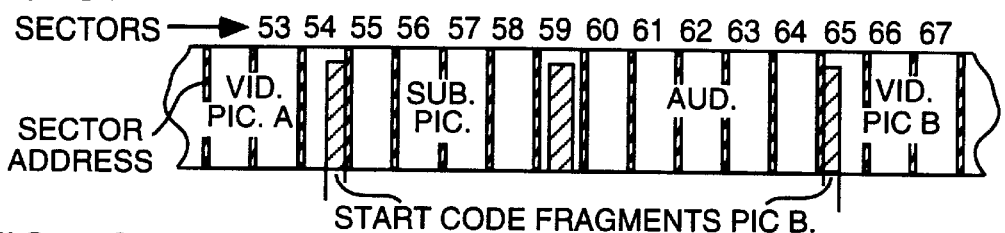
Figure 5C:
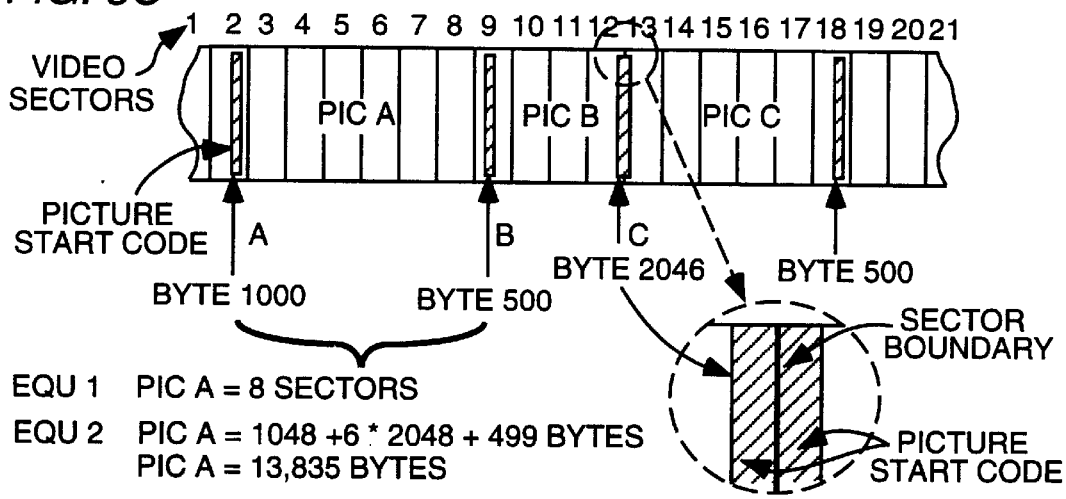
FIG. 5C–5D depict exemplary data in buffer memory.

The determination of picture data may be performed in units of sectors referenced in bit stream 41 or track buffer 60A. However, since an MPEG picture start code is buried within DVD data formatting and is not constrained to start coincident with a sector boundary the resulting location of picture start codes in units of sectors may inevitably include fragments of a preceding, possibly non-video sector. FIG. 5A shows part of exemplary bit stream 41 including a video object unit containing audio video and sub-picture data sectors. Each sector contains 2048 payload bytes with sector addresses shown shaded at the sector boundary. In FIG. 5B video picture A is shown ending in sector 54 and is immediately followed by the start code for video picture B. However, the remainder of video picture B start code occurs in sector 65, with intervening sectors 55–64 containing sub-picture and audio data. Determination or location of picture data/video sectors in units of sectors is illustrated in FIG. 5C where a start code for exemplary picture A is shown in sector 2 with the start code of next picture B, occurring in sector 9. Equation 1 shows picture data location by sector count, since picture A starts in sector 2 and ends in sector 9, picture A has a duration of 8 sectors. Unwanted data fragments are illustrated FIG. 5C, where video data is depicted referenced to (video) sector numbers. However such video sector numbering may be directly related to the sector number or address in the reproduced bit stream. In FIG. 5C a video bit stream is shown with an exemplary picture A depicted with a picture start code initiated at byte 1000 of video sector 2. Clearly the preceding 999 bytes of sector 2 correspond to data from a preceding picture. It is possible to employ more detailed processing where the picture data is located the units of bytes. Byte accurate processing may require more complexity of memory control than that required for sector level accuracy. However, if byte accurate processing is employed only complete picture data are stored in the video bit buffer, thus fragments are eliminated and hang up of MPEG decoder 530 is avoided. Byte accurate picture determination is shown in FIG. 5C for exemplary picture A, where a picture start code starts at byte 1000 of video sector 2 and picture B start code starts at byte 1500 of sector 9. Hence the size of picture A may be calculated, by use of equation 2, as 13,835 bytes. Thus byte accurate picture addresses allow microprocessor 510 to point to a specific byte in exemplary video bit buffer 60B from which variable length decoder VLD 531, of FIG. 3, is to start decoding.

Figure 5D:
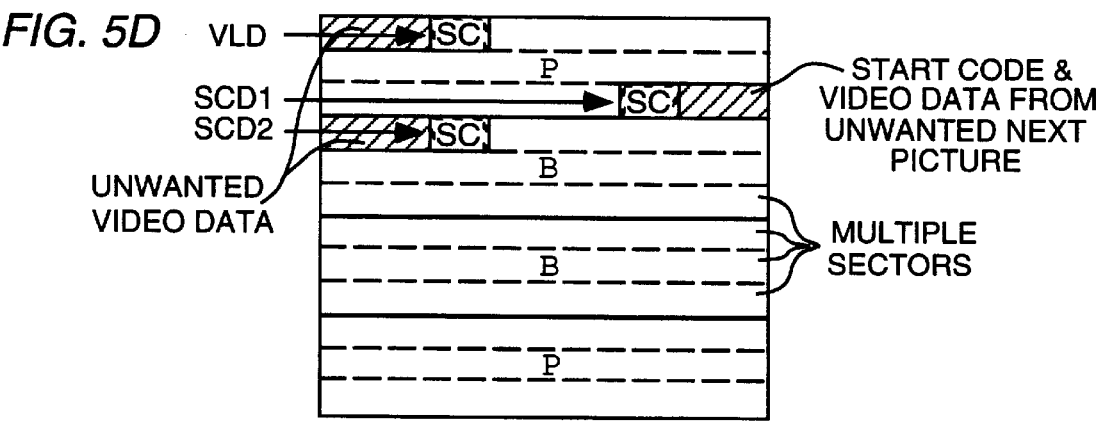

If picture data is determined in units of sectors, the MPEG decoder reading pictures from the video bit buffer must be protected from hang up due to fragments of discarded pictures occurring before or after the wanted picture is decoded. Such picture fragments are depicted in exemplary video bit buffer of FIG. 5D which shows multiple sectors containing P and B pictures where unwanted data from a previous, or following picture are shown with diagonal shading. Each video object block unit or VOBU includes navigation data that identifies the end sector address of the first I picture and the last sector addresses of two following reference or P pictures of the first GOP of the VOBU. In addition the navigation data includes sector addresses of I-pictures in preceding and succeeding VOBUs, hence an I-picture only trick mode may be readily provided. However, problems resulting from picture fragments may be avoided if the end byte of the wanted picture can be identified. Microprocessor 510/A, for example type ST20, is advantageously configured as a hardware search engine which searches through the data stored in the track buffer to locate the ending byte of the I-picture within the ending sector stored in the buffer 60A. Thus by identifying an I-picture, it alone may be loaded into video bit buffer 60B, hence avoiding the storage of partial pictures which may cause problems of decoder lockup. The exemplary microprocessor 510/A may be employed to find start codes in an I-picture only mode since the ending sector is known from the navigation data. However, for P, B or multiple I-pictures, the exemplary microprocessor may not provide a practical solution since testing has to be performed on every byte of data in the bitstream, which represents an operationally intensive usage of microprocessor 510.

The location and determination of start codes prior to decoding may be facilitated by an arrangement which utilizes the link interface block 505 of FIG. 3 to search for start codes in the bitstream prior to track buffer 60A. Such use of link interface 505 advantageously provides early pre-processing or parsing for picture and or audio headers which may be signaled to microprocessor 510. Thus, having identified headers in the incoming bitstream prior to the track buffer, pictures and audio required by a specific trick mode may be stored in exemplary track buffer 60A with unwanted pictures and or other data deleted in the buffer by overwriting.

In a first arrangement start codes are located by use of start code detector 520 which searches the bit stream in either the mechanical/track buffer 60A or the video bit buffer 60B. Although this method has an advantage in that MPEG start code detector design is known, the detector however requires contiguous data. Hence only data in the video bit buffer, stripped of DVD and transport data structure may be searched. Thus searching for MPEG data within the mechanical/track buffer may be difficult to facilitate, may not optimally use memory, and exemplary microprocessor 510 may be heavily loaded with interrupts, thus requiring the addition of a second microprocessor for example, 510A specifically to implement start code detection.

In an inventive arrangement, start code detection is facilitated by a start code detector which searches the bit stream prior to, or within track buffer 60A exclusively for start codes. Thus by advantageously providing early parsing of MPEG picture headers within the bit stream, trick play picture requirements are anticipated and memory manipulation specific to trick play operation may be performed. The video packet stream prior to the video bit buffer may be advantageously processed during trick mode operation. For example, in a reverse replay mode, such pre-processing permits trick play specific selection between pictures to be buffered for decoding, and those unwanted pictures to be discarded before storage. Such picture selection, for example discarding B-frames, may approximately double the number of I and P pictures stored in exemplary video bit buffer 60B during trick play operation. Thus by selection and deletion, video bit buffer 60B stores only wanted, or trick play specific pictures, hence more video object units or VOBUs may be stored further enhancing trick play operation.

In a first inventive arrangement the storage capacity track buffer 60A and video bit buffer 60B are increased during a trick play mode by selecting for storage only data that is to be used subsequently. For example, in an exemplary trick play mode B frames may not be decoded, hence need not be stored in the track or video bit buffers. Thus only needed pictures are stored, and unwanted picture or other data is discarded. To facilitate this advantageous selection between wanted and unwanted pictures requires that the bit stream or video packet stream be pre-processed, parsed or searched to locate a sequence-header, group_of_picture_header or picture_header prior to storage. Thus parsing or pre-processing of the compressed bit stream allows the determination of MPEG parameters such as, time_code, closed_gop, and broken_link data for each group of pictures or GOP. In addition, by pre-processing the packet stream the picture_start_code may be located thus permitting processing of the picture_header which in turn allows the determination of, for example, the temporal_reference, picture_coding type (I, P and B). However, such advantageous MPEG parsing is difficult, as has been described, due to DVD partitioning MPEG like data into sectors of 2048 bytes. In addition, because the MPEG start codes (4 bytes) are not sector aligned, an exemplary picture start code may be distributed across a sector boundary. FIG. 5B illustrates a bitstream prior to track buffer 60A where video picture A ends in sector 54 and is immediately followed by the start code for video picture B. However, the remainder of video picture B start code occurs in sector 65, with intervening sectors 55–64 containing sub-picture and audio data.

FIG. 5C illustrates a demultiplexed video sector bitstream prior to video bit buffer 60B where a start code for exemplary picture A is shown in sector 2 with the start code of next picture B, occurring in sector 9. A distributed start code occurs for picture C which is initiated at byte 2046 of sector 12 and continues in sector 13. Hence, part of the start code is in one video sector with the remainder in the next video sector.

Figure 6:
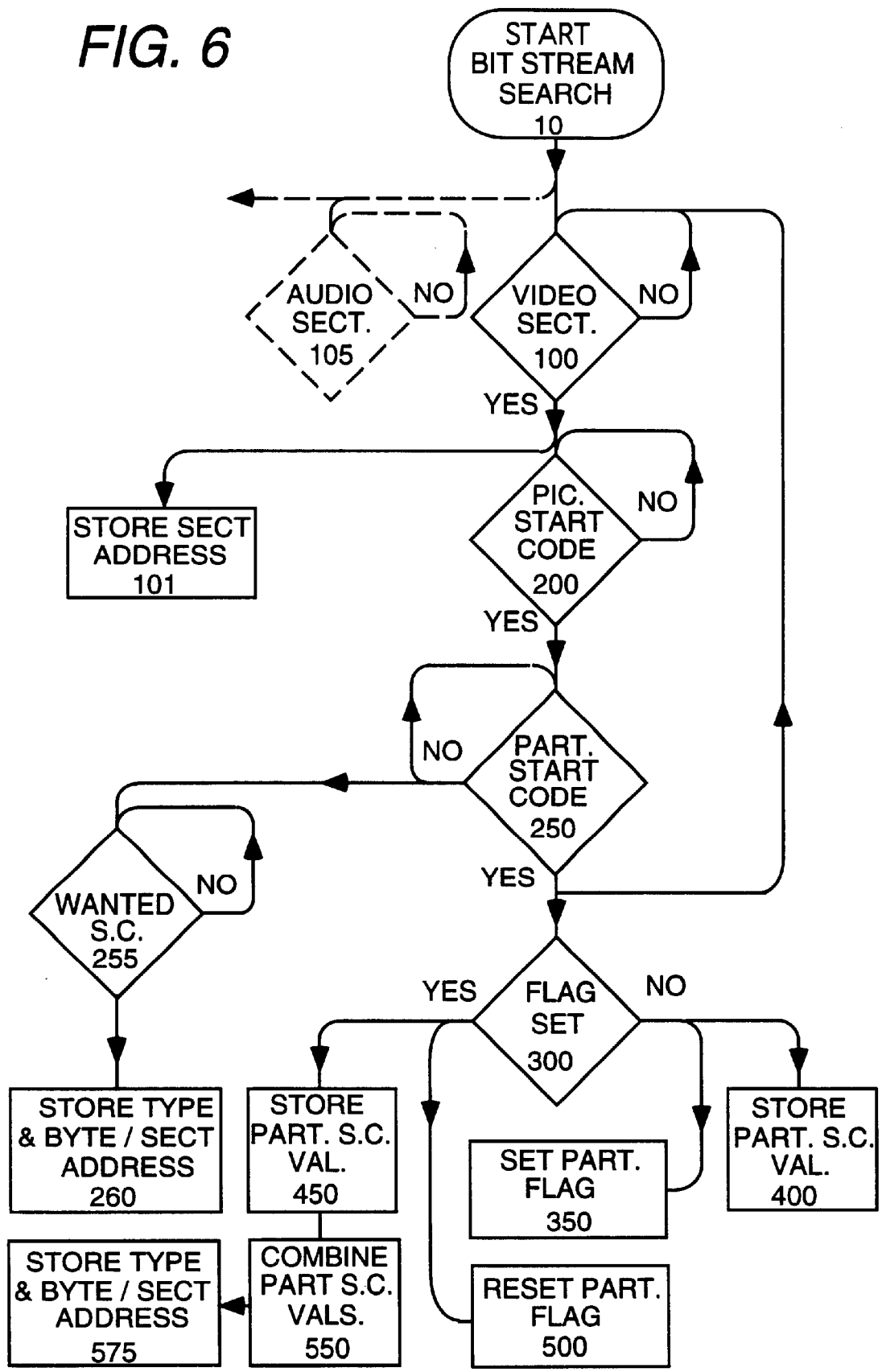
FIG. 6 is a flow chart illustrating an inventive arrangement for the recovery of start codes distributed across sector boundaries.

To enable a bitstream with distributed start codes to be parsed an inventive method shown in FIG. 6 is employed. The method shown in FIG. 6 identifies and saves sector types and addresses, and in addition identifies and saves wanted start codes. Distributed or partial start codes are identified and saved by the use of an inventive partial start code flag which indicates the occurrence. The remainder of the start code occurring in the next video sector is identified and recovered to complete start code. The inventive method of FIG. 6, depicts searching and MPEG parsing applied to bit stream 41 prior to track buffering. The bit stream is searched for wanted sectors, for example a video sector, which is then searched for distributed start codes. A distributed start code may be separated by other non-video sectors containing for example audio, sub-pictures, navigation data etc. Thus the bit stream is searched and the subsequent video sector identified and processed, while the intervening non-video sectors, not currently required, for example during a specific trick mode, are not processed and may be discarded prior to storage or over written in exemplary track buffer 60A. Thus having identified the next video sector, the packet data is searched to locate the next start code. However, because the partial start code flag is set, the remainder of the partial start code is searched for, and with its occurrence this remainder is combined with that of the preceding video sector to complete the start code.

The chart in FIG. 6 illustrates the inventive method employed for bit stream searching to identify wanted sector addresses, picture types and addresses, and for detecting and reassembling distributed start codes. The method starts at step 10 where an error corrected bitstream is searched to locate specific wanted sectors from a plurality of sectors including, navigation, audio video sector sub-picture data sectors. A video sector is detected at step 100 where a NO result forms a loop which continues the bitstream search. Similarly, an audio sector may be detected at step 105 and its sector address stored accordingly. If step 100 tests YES, a video sector is detected and the sector address is stored at step 101. A detected video sector initiates a further test at step 200 to detect a start code within the video sector. Step 200 depicts picture start code, however, various start codes may be present, for example sequence-headers, GOP headers or picture-headers all exist within the video sector hence any may suffer distribution across a sector boundary. A NO at step 200 forms a loop which continues to search for a start code within the video sector. A YES at step 200 indicates detection of a start code which initiates a further test to detect a partial start code at step 250. A NO at step 250 forms a loop to wait for a partial start code occurrence. In addition, the NO at step 250 also indicates detection of a complete start code which is tested at step 255 to determine if it is a wanted type. Wanted start codes test YES at step 255 which results in the storage of the type and byte location within the sector address at step 260.

Detection of a partial start results in a YES at step 250 which causes the sequence to restart searching the bitstream to locate the next video sector by looping back to step 100. The YES at step 250 also initiates a test at step 300 to determine if a partial start code flag is set. The partial start code flag is not set until a first distributed or partial start code is detected. Thus NO at step 300 sets the partial start code flag at step 350, and in addition stores the value of the partial start code at step 400. A YES at test 300 indicates detection of the remainder or residue of the distributed start code and results in resetting the partial start code flag at step 500. The YES at step 300 also results in storage of the detected start code remainder at step 450. At step 550 the values of the partial start code from step 400 and its remainder from step 450 are combined to reform the distributed start code. Finally at step 575 the reformed start code type, byte and sector address are stored. Hence the inventive method described identifies and stores secific sector types and addresses, identifies and stores start code types and byte addresses within sectors, and identifies and reassembles distributed start code fragments. Thus a DVD format bit stream may be parsed to determine for example, specific MPEG coded picture types, prior to buffer storage.

It is advantageous to control MPEG picture decoding order based on knowledge of where the pictures start and stop in the video bit buffer. Thus knowledge of picture location in the video bit buffer 60B, for example as illustrated in FIG. 5C or as determined by bitstream search of FIG. 6 permits memory start pointers in the start code detector 520 and variable length detector 531 to be advantageously directed to randomly access pictures as required, for example, during trick mode operation. Operation in reverse at play speed and or slow motion playback requires the reproduction of B-frames. Such reverse mode operation may be advantageously simplified in terms of buffer memory requirements by reversing the order in which adjacent B pictures are decoded. This reversal of decoding order is advantageously achieved by setting the memory start pointers to enable decoding of the picture required by the trick mode. In addition buffer memory size and control may be simplified during trick play operation by advantageously skipping or not reading pictures in the video bit buffer as required by specific trick play algorithms. Memory size and control may be further optimized during trick play buffer by advantageously enabling multiple decoding of pictures either immediately or as specifically required by the trick play algorithm. The provision of these advantageous features requires careful control of read/write functions and the synchronization therebetween.

Figure 4:
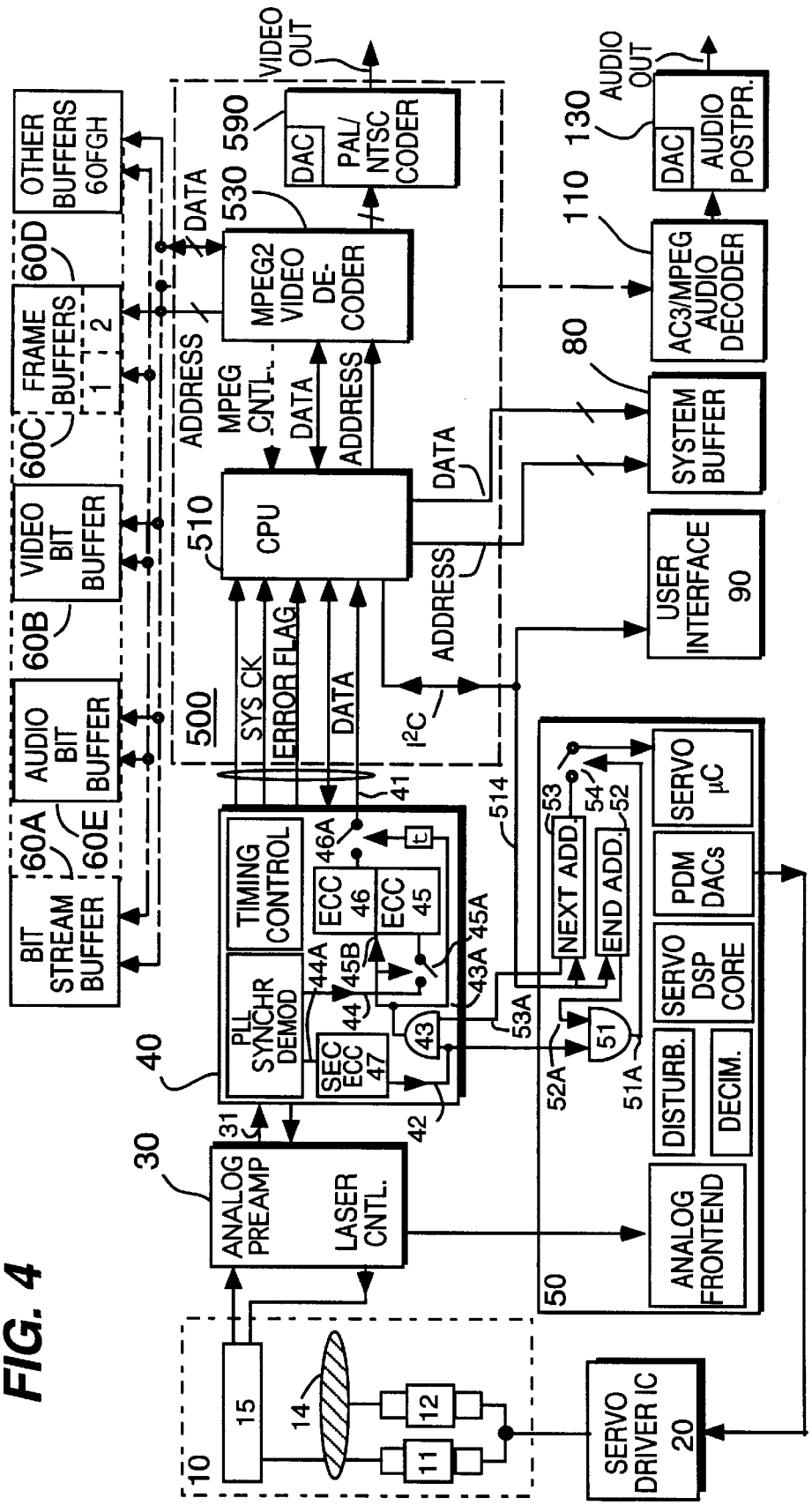
FIG. 4 shows the digital disk player of FIG. 2 including other advantageous arrangements to those of FIG. 2.

The block diagram of FIG. 4 shows the same functions and element numbering as depicted in FIG. 2, however, FIG. 4 includes additional advantageous arrangements which enhance digital disk player operation. The exemplary digital video disk player shown in FIGS. 2, 3 and 4 may be considered to comprise two parts namely a front end and a back end. The front end controls the disk and transducer with the back end providing MPEG decoding and overall control. Such functional partitioning may represent an obvious solution for consistent, steady state, MPEG decoding. However, such partitioning of processing with control from the back end may result in microcontroller overload, for example, during trick mode operation and particularly in the reverse direction. As has been described, microcontroller 510 is required to manage bitstream 41 received from the front end and identify wanted from unwanted data. In an advantageous arrangement a replay bitstream may be searched, for example to locate a specific MPEG encoded picture for storage, and or determine a byte specific address for said specific MPEG encoded picture in said replay bitstream or said storage medium.

What is claimed is:

1. A method for acquiring a start code from a plurality of start codes in a data stream arranged in a plurality of sectors transduced during reproduction by a digital disk apparatus, comprising the following steps:

a) searching said data stream to locate a specific sector type in said plurality of sectors;

b) searching said specific sector type to locate a start code from said plurality of start codes;

c) determining said start code to be incomplete;

d) searching said data stream to locate a second sector of said specific sector type in said plurality of sectors;

e) searching said second sector of said specific sector type to locate a second start code of said start code type from said plurality of start codes;

f) determining said second start code to be a residue of said incomplete start code;

g) combining said incomplete start code value and said residue start code value to form a complete start code.

2. The method of claim 1, comprising the additional steps of:

h) reading a type from said complete start code;

i) storing said type read from said complete start code;

j) calculating a byte address for said complete start code; and, k) storing said byte address for said complete start code.

3. The method of claim 1, wherein said step a) comprises:

aa) storing a sector address for specific sector type.

4. The method of claim 1, wherein said step c) comprises:

ca) storing a value of said determined incomplete start code.

5. The method of claim 1, wherein said step c) comprises:

cb) setting a flag.

6. The method of claim 1, wherein said step c) comprises:

cc) storing a byte address for a start code determined to be complete.

7. The method of claim 1, wherein said step f) comprises:

fa) storing a value of said residue of said start code type.

8. The method of claim 1, wherein said step f) comprises:

fb) resetting said flag.

9. An apparatus for reproducing a digitally encoded signal from a medium, comprising:

a transducer for transducing said digitally encoded signal and generating a bit stream therefrom;

a processor coupled to receive said bit stream for controllably processing said bit stream;

a memory coupled to said processor for storing processed bit stream information; and a controller coupled to control said memory and said processor for controlling identification of information within said bit stream;

wherein said controller controls said processor to identify a specific sector type in said bit stream and responsive to said specific sector identification said controller controls said memory for storing said identified specific sector.

10. The reproducing apparatus of claim 9, wherein said controller controls said processor to identify an unwanted sector in said bit stream and responsive to said unwanted sector identification said controller controls said memory to overwrite said identified unwanted sector and prevent storage thereof.

11. The reproducing apparatus of claim 10, wherein said apparatus operates in a trick mode said controller controls said memory to overwrite said identified unwanted sector.

12. The reproducing apparatus of claim 9, wherein responsive to said specific sector identification said controller stores a sector address of said specific sector identified.

13. An apparatus for reproducing a digitally encoded signal from a medium, comprising:

a transducer for transducing said digitally encoded signal and generating a bit stream therefrom;

a first memory coupled to said transducer for storing said bit stream;

a second memory for storing data controllably coupled from said first memory; and, a controller coupled to control said first and second memories for controlling identification of information within said bit stream;

wherein said controller controls said first memory to output said bit stream from a specific sector address therein, and said bit stream from said specific sector address having first and second parts, said controller controls said second memory to store said first part of said bit stream output from said specific sector address, and wherein said controller controls said second memory to over write said second part of said bit stream output from said specific sector address.

14. An apparatus for reproducing a digitally encoded signal from a medium, comprising:

a transducer for transducing said digitally encoded signal and generating a bit stream therefrom;

a memory coupled to said transducer for storing said bit stream;

a processor coupled to said memory for processing said stored bit stream and including an software algorithm to identify an MPEG start code distributed between data sectors in said stored bit stream;

said processor searches said stored bit stream responsive to said algorithm to identify said distributed MPEG start code and when identified said processor indicates said identification and stores a sector address of said identified distributed MPEG start code and said algorithm reconstructs said distributed MPEG start code to form a complete MPEG start code.

* * * * *